United States Patent
Raedel et al.

(10) Patent No.: US 9,881,611 B2
(45) Date of Patent: Jan. 30, 2018

(54) SYSTEM AND METHOD FOR PROVIDING VOICE COMMUNICATION FROM TEXTUAL AND PRE-RECORDED RESPONSES

(71) Applicant: Verizon Patent and Licensing Inc., Arlington, VA (US)

(72) Inventors: Michelle Roos Raedel, Reston, VA (US); Steven T. Archer, Dallas, TX (US); Paul Hubner, McKinney, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 142 days.

(21) Appl. No.: 14/309,098

(22) Filed: Jun. 19, 2014

(65) Prior Publication Data

US 2015/0371636 A1    Dec. 24, 2015

(51) Int. Cl.
| | |
|---|---|
| G10L 15/26 | (2006.01) |
| H04M 3/53 | (2006.01) |
| G10L 13/027 | (2013.01) |
| H04M 3/22 | (2006.01) |
| G10L 25/48 | (2013.01) |
| H04L 29/06 | (2006.01) |
| H04W 12/02 | (2009.01) |

(52) U.S. Cl.
CPC ............ G10L 15/26 (2013.01); G10L 13/027 (2013.01); G10L 25/48 (2013.01); H04L 63/1491 (2013.01); H04M 3/2281 (2013.01); H04M 3/5322 (2013.01); *H04W 12/02* (2013.01)

(58) Field of Classification Search
CPC . Y10T 477/60; Y10T 74/19251; Y10T 74/20; Y10T 74/20018; Y10T 74/2014; G10L 15/26; G10L 13/027; G10L 25/48; H04M 3/5322; H04M 3/2281; H04L 63/1491; H04W 12/02
USPC ........................................................ 704/235
See application file for complete search history.

(56) References Cited

U.S. PATENT DOCUMENTS

| | | | | |
|---|---|---|---|---|
| 6,173,259 | B1 * | 1/2001 | Bijl | G06F 3/16 |
| | | | | 704/235 |
| 2011/0301951 | A1 * | 12/2011 | Basir | G06Q 30/0201 |
| | | | | 704/235 |
| 2014/0057610 | A1 * | 2/2014 | Olincy | H04W 4/16 |
| | | | | 455/414.1 |
| 2015/0081291 | A1 * | 3/2015 | Jeon | G06F 3/167 |
| | | | | 704/235 |

* cited by examiner

*Primary Examiner* — Houshang Safaipour
*Assistant Examiner* — Bharatkumar S Shah

(57) ABSTRACT

An approach is provided for detecting a voice call directed to a user. The approach involves presenting a user interface for interacting with the voice call, wherein the user interface includes a control option for selecting a pre-recorded word or phrase from the user; for generating a custom-created audio word or phrase from one or more phonemes pre-recorded by the user; or a combination thereof. The approach also involves interjecting the pre-recorded word or phrase, the custom-created audio word or phrase, or a combination thereof into the voice call.

20 Claims, 16 Drawing Sheets

SYSTEM AND METHOD FOR PROVIDING VOICE COMMUNICATION FROM TEXTUAL AND PRE-RECORDED RESPONSES

BACKGROUND INFORMATION

It is a commonplace event for users to talk on their mobile communication device in close proximity with other people in public spaces. The privacy of the conversation held in public places is difficult to maintain. As a result, the prevalence of mobile communication devices calls for a better understanding of the privacy implication on communications conducted in public places.

Therefore, there is a need for a method that merges textual and pre-recorded voice responses into a voice communication for preventing overhearing of private conversations in public spaces.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for conveying pre-recorded and/or custom-created words or phrases into a communication session, is described. In the following description, for the purposes of explanation, numerous specific details are set forth in order to provide a thorough understanding of the present invention. As is well known, the present invention may be practiced without these specific details or with an equivalent arrangement. In other instances, well-known structures and devices are shown in block diagram form in order to avoid unnecessarily obscuring the present invention.

Figure 1:
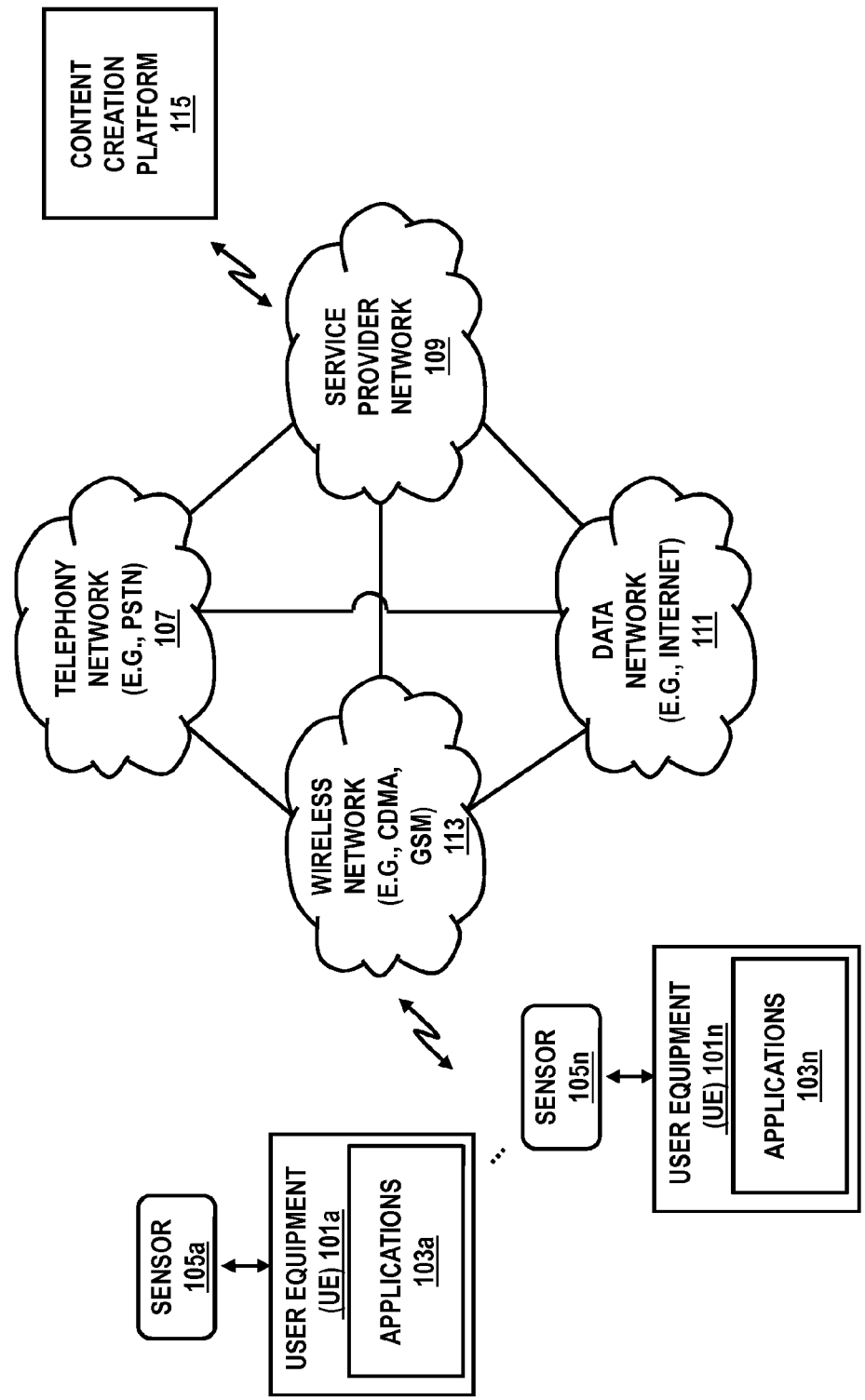
FIG. 1 is a diagram of a system capable of conveying pre-recorded and/or custom-created words or phrases into a communication session, according to one embodiment.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the content creation platform 115 via networks 107-113. In one embodiment, the content creation platform 115 performs one or more functions associated with conveying pre-recorded and/or custom-created words or phrases into a communication session.

As discussed, the privacy for voice conversation is difficult to maintain in close quarters. Needless to mention, it may be socially unacceptable to hold voice conversation in some public area (e.g. restaurants, airplanes, ceremonies, etc.). Despite these reasons, calls are often required. In one example embodiment, a user is at a public area (e.g. airport) and there is a very important conference call taking place. Though the user is in a public area, he is avidly listening and wants to participate as there is a heated debate going on. However, the user may not be comfortable offering his verbal participation because of privacy issues, for example, the fear of nearby people eavesdropping to his conversation. As a result, there is a requirement for a system that offers an opportunity to a user to actively participate in a conference call without any voice input. In one embodiment, system 100 provides a method and a service for users to offer verbal input electronically. The system 100 allows for textual and triggered voice responses to be merged into a voice communication. The voice communications may be incorporated into a users' voice, and may be stored on the network for any device to use.

In one embodiment, the system 100 may learn the manner in which users speak. In one scenario, a user may use his UE 101 and listen to a communication session with his headset. The user may want to interject a conversation, wherein the user can activate this input methodology, whereupon the system 100 may come with standard phrases that may have been pre-recorded and pre-defined by the user. The user may either select a response from the list or may begin typing a response and then have system 100 suggest words and/or sentences so that the user need not type the entire words and/or sentences. This interactive system 100 may learn and capture user's voices so that when it is presenting a response, it is presented in the voice of the user.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as media player applications, social networking applications, calendar applications, content provisioning services, and the like. In one embodiment, one of the applications 103 at the UE 101 may act as a client for the content creation platform 115 and may perform one or more functions associated with the functions of the content creation platform 115 by interacting with the content creation platform 115 over the networks 107-113.

By way of example, the sensors 105 may be any type of sensor. In certain embodiments, the sensors 105 may include, for example, a network detection sensor for detecting wireless signals or receivers for different short-range communications (e.g., Bluetooth, WiFi, Li-Fi, near field communication etc.), a camera/imaging sensor for gathering image data, an audio recorder for gathering audio data, and the like. In one embodiment, the sensors 105 may detect user interaction with a user interface elements generated by the UE 101, applications 103, and/or the content creation platform 115. In another embodiment, the sensors 105 may detect a gesture-based input, wherein pre-stored action patterns, for example, a gesture (an action) of raising a hand, head movements etc., may be used to determine user inputs. In one example embodiment, the sensors 105 may detect lips movements of a user, wherein the user is mouthing words without actually speaking.

For illustrative purposes, the networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, networks 107-113 may embody or include portions of a signaling system 7 (SS7) network, or other suitable infrastructure to support control and signaling functions.

In one embodiment, the content creation platform 115 may be a platform with multiple interconnected components. The content creation platform 115 may include multiple servers, intelligent networking devices, computing devices, components and corresponding software for conveying pre-recorded and/or custom-created words or phrases into a communication session. In addition, it is noted that the content creation platform 115 may be a separate entity of the system 100, or included within the UE 101 (e.g., as part of the applications 103).

In one embodiment, the content creation platform 115 may implement various ways of creating and using contents. In one scenario, the content creation platform 115 may record user speech via UE 101 for playback purposes in the future. The content creation platform 115 is an interactive platform where data can be imputed either previously or on-the-fly. In one scenario, the content creation platform 115 may create data automatically since the data is stored in the cloud for processing purposes.

In one embodiment, the content creation platform 115 upon detecting a voice call may determine the surrounding for the at least one user via sensors 105. In one example embodiment, the sensors 105 may detect movement of people in a surrounding where the at least one user is situated. Then, the content creation platform 115 may either change the preference setting to an alternative input method or may seek for user approval to change to an alternative input method.

In one embodiment, the content creation platform 115 may present at least one user with a user interface for interacting with the voice call. The user interface includes several elements, for example, a control option for selecting a pre-recorded word or phrase. In another embodiment, a user interface element may include an option for generating a custom-created audio word or phrase from one or more phonemes pre-recorded by the user. In one scenario, the content creation platform 115 may improves itself by keeping track of the words and phrases used by at least one user. The content creation platform 115 may then transmit the report and data to the cloud for manipulating, storage and statistical processing.

In one embodiment, when a user uses a text function, the content creation platform 115 may know the exact text of a phrase, and may also know the assembled text-to-speech algorithm process. In one scenario, the content creation platform 115 may recreate the phrases. Then, the content creation platform 115 may run these audio phrases through a speech-to-text processing. Subsequently, the content creation platform 115 may compare the results to the original typed text. Such results may be used to further refine the speech creation process on a per user basis. In one scenario, the content creation platform 115 may save the one or more corrections to the database 211. In one example embodiment, the content creation platform 115 may capture words and/or phrases directly, wherein the words and/or phrases are processed to further enhance to a user's phoneme descriptors, speech cadence and tone.

According to exemplary embodiments, end user devices may be utilized to communicate over system 100 and may include any customer premise equipment (CPE) capable of sending and/or receiving information over one or more of networks 107-113. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

Figure 2:
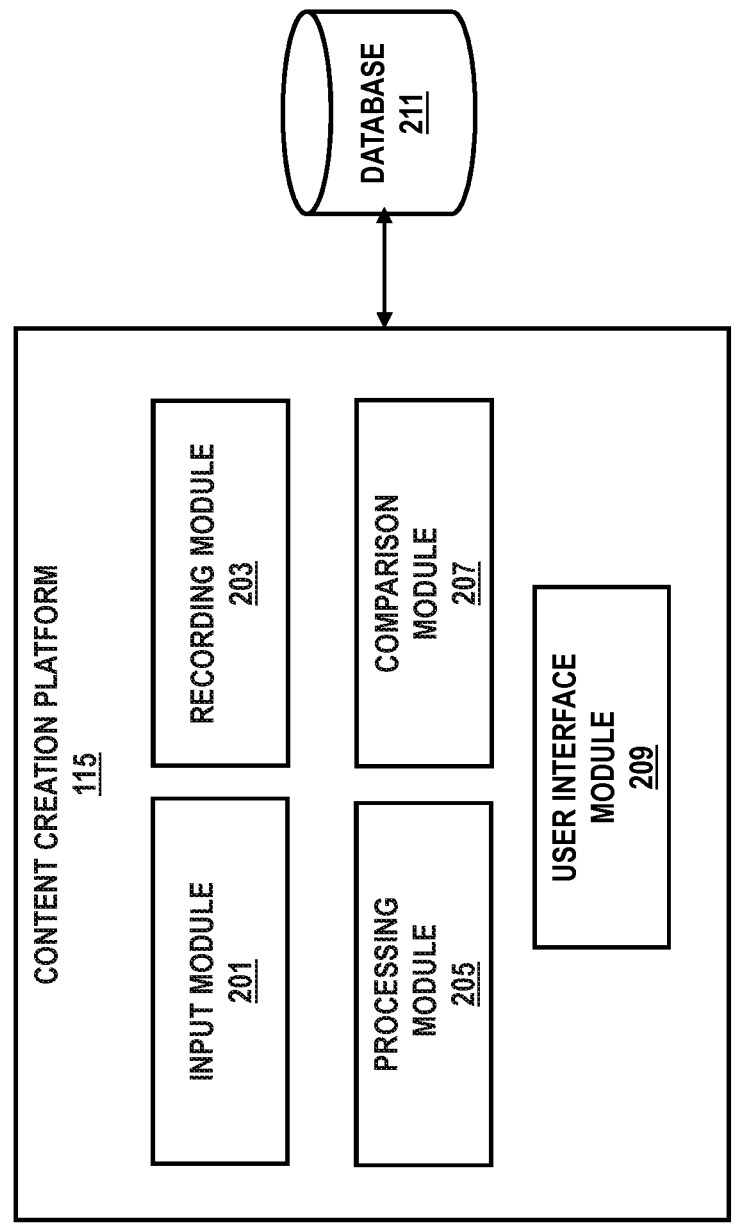
FIG. 2 is a diagram of the components of the content creation platform 115, according to one embodiment.

FIG. 2 is a diagram of the components of the content creation platform 115, according to one embodiment. By way of example, the content creation platform 115 includes one or more components for merging textual and pre-recorded voice responses into a voice communication. It is contemplated that the functions of these components may be combined in one or more components or performed by other components of equivalent functionality. In this embodiment, the content creation platform 115 includes an input module 201, a recording module 203, a processing module 205, a comparison module 207, a user interface module 209, and database 211.

In one embodiment, the input module 201 may receive prerecorded messages (e.g. voice words or phrases) from at least one user that is to be transmitted to at least one other user during a communication session. In one example embodiment, the content creation platform 115 may switch at least one UE 101 to a prerecorded mode to initiate a playback of the prerecorded messages to a party with whom the user is communicating. In one scenario, a prerecorded mode may be a mode wherein the microphone of the UE 101 is disabled, and the at least one user may select a prerecorded messages via user interface elements. In another embodiment, the input module 201 may receive textual input from at least one user from converting the texts to speech.

In one embodiment, the recording module 203 may cause a recording of speech of at least one user. The recording module 203 may associate the speech recording with a user specified or selected label. In one example embodiment, at least one user may record verbal messages that may be useful in a future conversation. In such manner a user can maintain a limited audible conversation with the other participants in a communication session without actually speaking. In another embodiment, one or more users may opt to record phoneme creation phrases. In one scenario, the content creation platform 115 may cause a selection of such recorded phoneme phrases to ensure that all phonetic patterns are uttered by the user and recorded by the recording module 203 for future use.

In one embodiment, the processing module 205 may cause a processing of the textual input received from the one or more user via input module 201 to cause a text analysis. The text analysis process involves the processing module 205 identifying phonemes, pronunciation, pitches, and other information associated with the at least one textual input. The processing module 205 may also refer to a dictionary before causing letter to sound conversion. In one example embodiment, the processing module 205 may cause an expansion of abbreviations and numbers to full words, for example, in the sentence 'Dr. Mike works at 123 King Dr.', the first 'Dr.' is transcribed as 'Doctor', while the second 'Dr.' is transcribed as "Drive". Further "123" is expanded to "one hundred and twenty-three". In another embodiment, the processing module 205 includes a processing logic that processes the pre-recorded voice messages to cause their playback during a communication session. In one example embodiment, at least one user may record messages such as 'yes', 'no', 'I will have to get back to you on that question'. In one scenario, the processing module 205 may cause a recommendation of replies from pre-recorded speeches to the content creation platform 115.

In one embodiment, the comparison module 207 may cause a comparison of the text equivalent to the text input to calculate an accuracy of the custom-created audio word or phrase. In another embodiment, the comparison module 207 may cause a comparison with the system's default pronunciation where a different pronunciation of a word is desired. In one example embodiment, the comparison module 207 may cause a comparison of the recreated audio phrases for one or more textual inputs with at least one user's diction to further refine the speech creation process on per user basis.

In one embodiment, the user interface module 209 employs various application programming interfaces (APIs) or other function calls corresponding to the applications 103 of UE 101, thus enabling the display of graphics primitives such as menus, buttons, data entry fields, etc., for generating the user interface elements to create textual and audio representations.

In one embodiment, the database 211 may store pre-rerecorded messages, textual inputs and speech related characteristics for the textual input, or a combination thereof. In another embodiment, the database 211 may store information regarding the phonemes, durations, pronunciations, etc. with respect to particular texts and/or sounds. In a further embodiment, the database 211 may store the recorded voice, and may process the phoneme into their base components. These phonemes are saved with their associated text and audio representations. In one example embodiment, users have words and phrases like 'Yes', 'I Agree', etc., and phonemes sounds like 'f', 'oh', 'n', 'eh', 'mm' stored.

The above presented modules and components of the content creation platform 115 can be implemented in hardware, firmware, software, or a combination thereof. Though depicted as a separate entity in FIG. 1, it is contemplated that the content creation platform 115 may be implemented for direct operation by respective UE 101. As such, the content creation platform 115 may generate direct signal inputs by way of the operating system of the UE 101 for interacting with the applications 103. In another embodiment, one or more of the modules 201-209 may be implemented for operation by respective UEs, as a content creation platform 115. Still further, the content creation platform 115 may be integrated for direct operation with services 107-13, such as in the form of a widget or applet, in accordance with an information and/or subscriber sharing arrangement. The various executions presented herein contemplate any and all arrangements and models.

Figure 3:
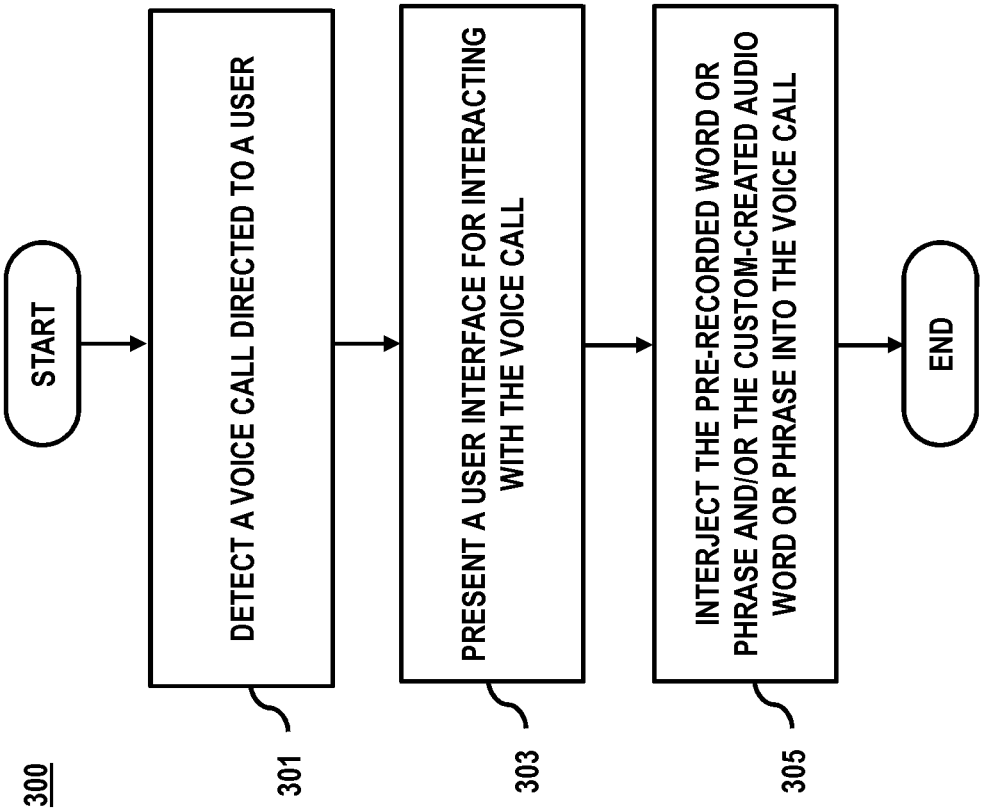
FIG. 3 is a flowchart of a process for conveying pre-recorded and/or custom-created words or phrases into a communication session, according to one embodiment.

FIG. 3 is a flowchart of a process 300 for conveying pre-recorded and/or custom-created words or phrases into a communication session, according to one embodiment.

In step 301, the content creation platform 115 may detect a voice call directed to a user. In one scenario, a user may participate in a communication session via his UE 101. Then, the content creation platform 115 may determine the surrounding of the user. In one scenario, the content creation platform 115 may present a user with an option to switch to an alternative mode wherein the user may infuse pre-recorded messages to a communication session. In another scenario, the content creation platform 115 may present a user with an option to type messages to be converted into speech to interject the custom-created word into the communication session.

In step 303, the content creation platform 115 may present a user interface for interacting with the voice call, wherein the user interface includes a control option for selecting a pre-recorded word or phrase from the user; for generating a custom-created audio word or phrase from one or more phonemes pre-recorded by the user; or a combination thereof. In one embodiment, the content creation platform 115 may associate one or more recordings with specific users. In one scenario, the content creation platform 115 may cause a presentation of various user interface elements, for example, buttons to trigger an opportunity to inject pre-recorded speeches into the call. In another scenario, a user may be presented with an area to type a textual message for conversion to a voice message. The input methods are user driven.

In step 305, the content creation platform 115 may interject the pre-recorded word or phrase, the custom-created audio word or phrase, or a combination thereof into the voice call. In one scenario, the custom-created audio is very close to human speech because of the continued focus from the cloud-based speech analytics and processing engines. The content creation platform 115 continues to learn and expand additional words, unique words, or a combination thereof so that the presentation is tailored per user. In one scenario, the tone of voice may vastly differ per user, as they have different speaking patterns, different use of words etc.

Figure 4:
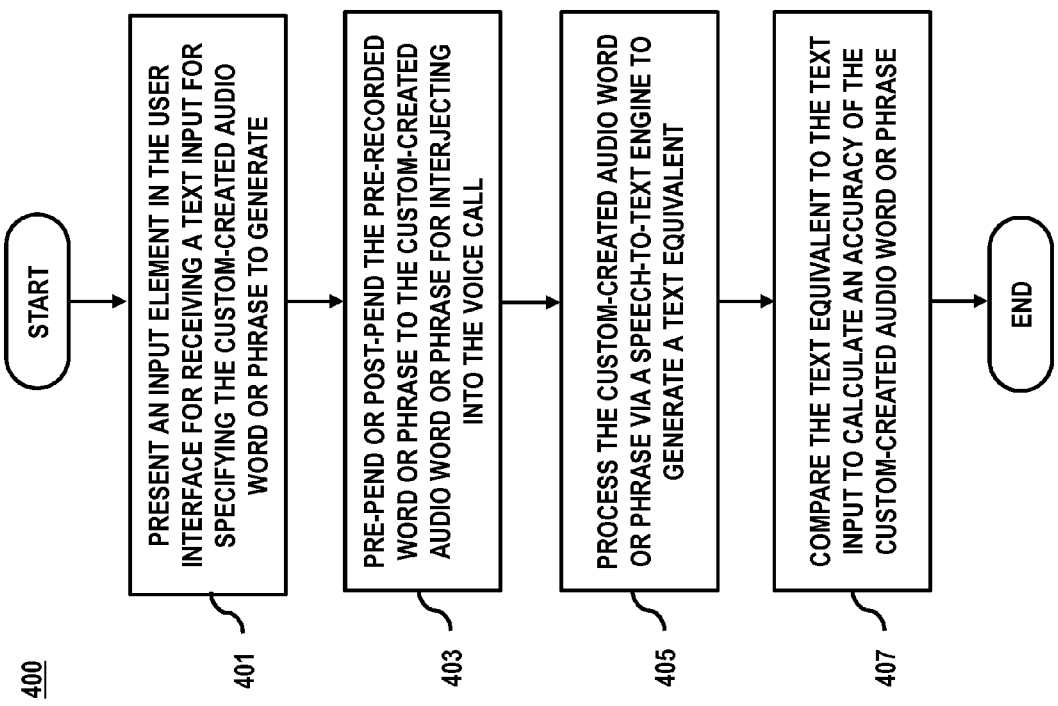
FIG. 4 is a flowchart of a process for generating a text equivalent of custom-created audio word or phrase, according to one embodiment.

FIG. 4 is a flowchart of a process 400 for generating a text equivalent of custom-created audio word or phrase, according to one embodiment.

In step 401, the content creation platform 115 may present an input element in the user interface for receiving a text input for specifying the custom-created audio word or phrase to generate. In one scenario, the content creation platform 115 may determine probable phrases a user is trying to say based on combination of words. For example, the content creation platform 115 may process the first word and/or the second word a user is trying to put together, and may propagate that into a longer phrase for quick interjection in a communication session.

In step 403, the content creation platform 115 may prepend or post-pend the pre-recorded word or phrase to the custom-created audio word or phrase for interjecting into the voice call. In one scenario, for clarity purposes the content creation platform 115 may prepend the pre-recorded message to the custom created audio message. Then, the content creation platform 115 may interject the newly created message into a communication session.

In step 405, the content creation platform 115 may process the custom-created audio word or phrase via a speech-to-text engine to generate a text equivalent. In one embodiment, the speech-to-text engine may be incorporated within the content creation platform 115. In one scenario, the speech-to-text engine may predict words or phrases a user is going to speak, and/or the manner in which a user pronounce the words or phrases. In another scenario, as the user uses the speech-to-text engine, the speech-to-text engine becomes more aware of the individual characteristic of what and how a user speaks. In another embodiment, the content creation platform 115 may consult dictionaries to generate a text equivalent custom-created audio word or phrase.

In step 407, the content creation platform 115 may compare the text equivalent to the text input to calculate an accuracy of the custom-created audio word or phrase. In one scenario, the custom-created audio word or phrase may be entwined with human speeches, for example, short pauses that a user may have while talking may be replicated during an interjection to a communication session. Therefore, giving time to a user to select new words, or fill in the phrases.

Figure 5:
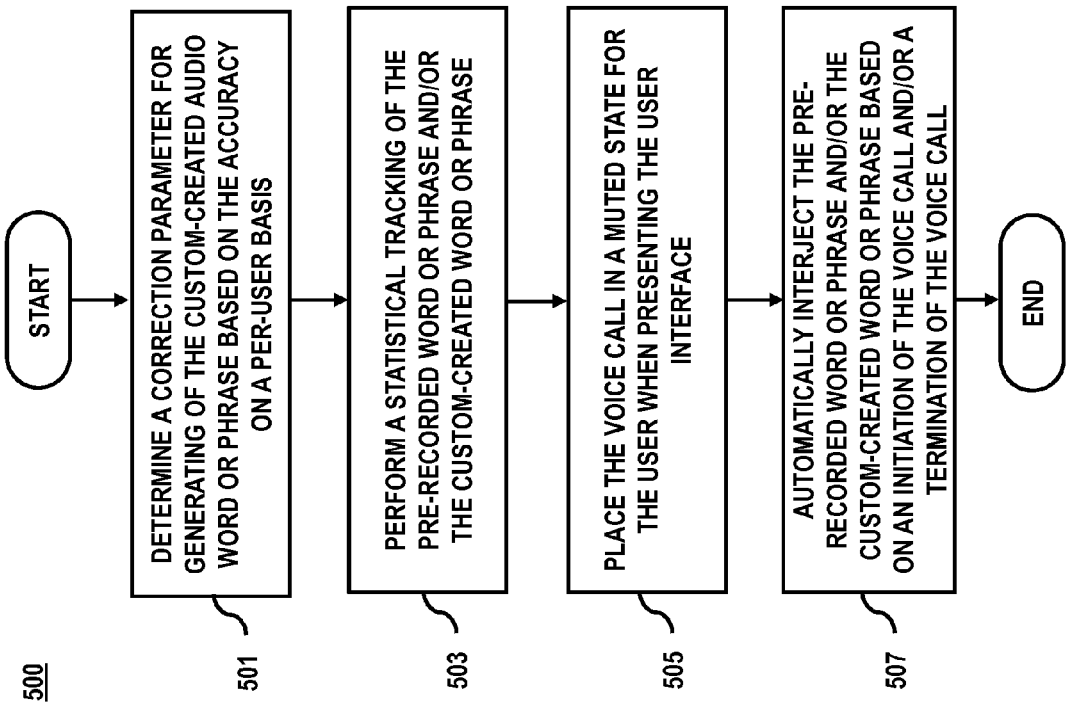
FIG. 5 is a flowchart of a process for determining a correction parameter, and performing of a statistical tracking, according to one embodiment.

FIG. 5 is a flowchart of a process 500 for determining a correction parameter, and performing of a statistical tracking, according to one embodiment.

In step 501, the content creation platform 115 may determine a correction parameter for generating of the custom-created audio word or phrase based on the accuracy on a per-user basis. In one scenario, the content creation platform 115 may compare the custom-created audio words or phrases with the original typed texts. Further, the content creation platform 115 may process the custom-created audio words to refine the speech on a per user basis. The determined corrections may be saved in database 211 for future reference.

In step 503, the content creation platform 115 may perform a statistical tracking of the pre-recorded word or phrase, the custom-created word or phrase, or a combination thereof. In one scenario, the content creation platform 115 may cause statistical processing of pre-recorded and/or custom-created messages to predict future usage. The content creation platform 115 may improves itself by keeping track of the words and/or phrases used by a user. In such manner, the content creation platform 115 may determine popular words used by a user during his/her speech. Further, such tracking may facilitate the content creation platform 115 to distinguish users' mannerism in terms of speaking.

In step 505, the content creation platform 115 may place the voice call in a muted state for the user when presenting the user interface. In one scenario, though being muted by default, a user may still participate verbally. The user may simply unmute the UE 101 to talk.

In step 507, the content creation platform 115 may automatically interject the pre-recorded word or phrase, the custom-created word or phrase, or a combination thereof based on an initiation of the voice call, a termination of the voice call, or a combination thereof. In one scenario, such automatic processing may cause a storing of new sound updates, and may implement various mechanisms for correct application of the new sounds.

Figure 6A:
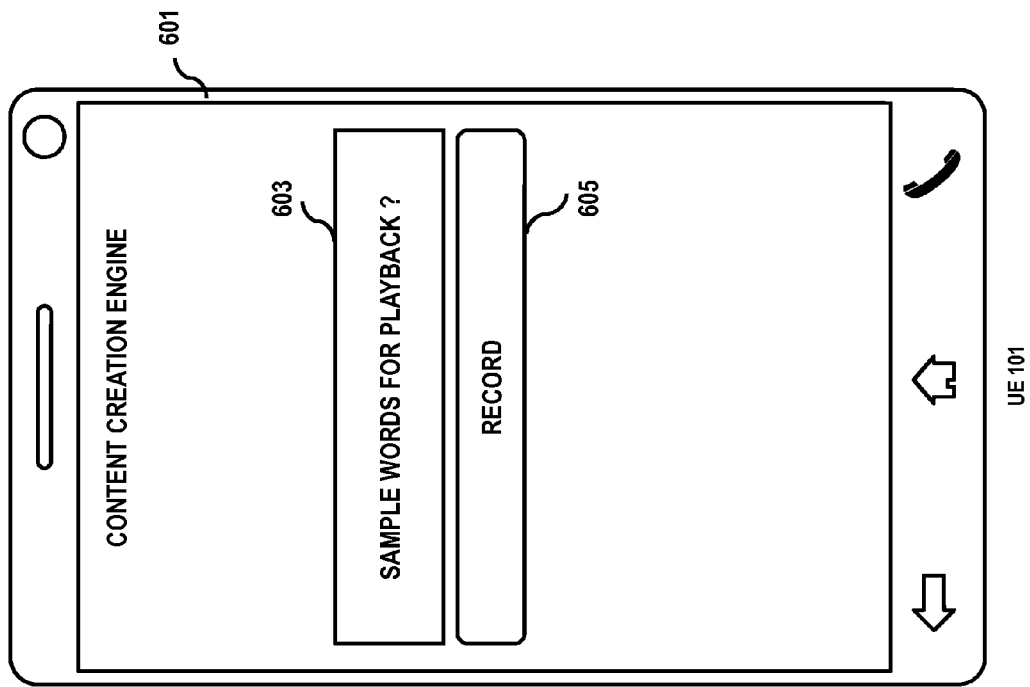
FIGS. 6 A-C are user interface diagrams that represents a scenario wherein a user records his/her voice for future use during a communication session, according to one example embodiment.
Figure 6B:
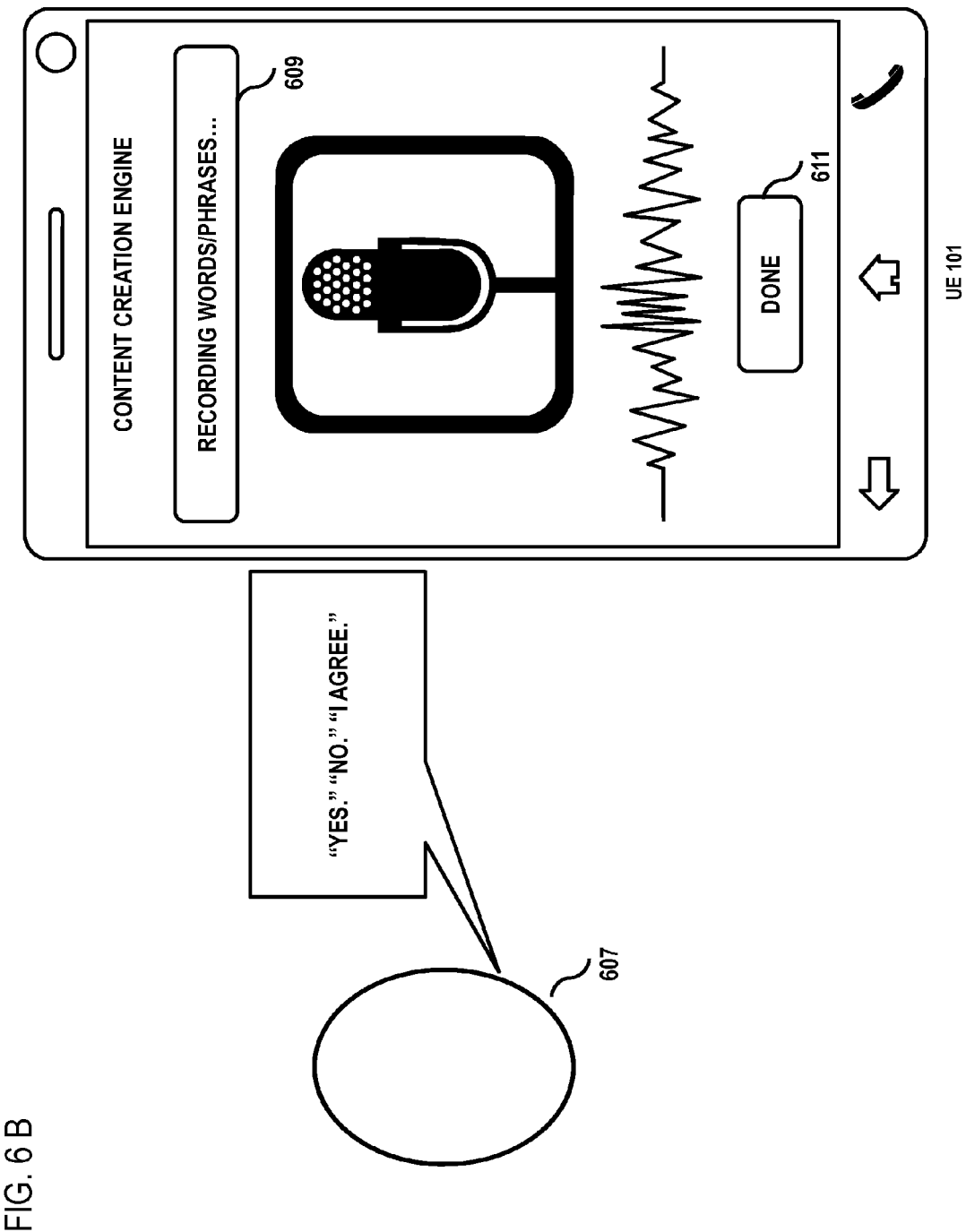
Figure 6C:
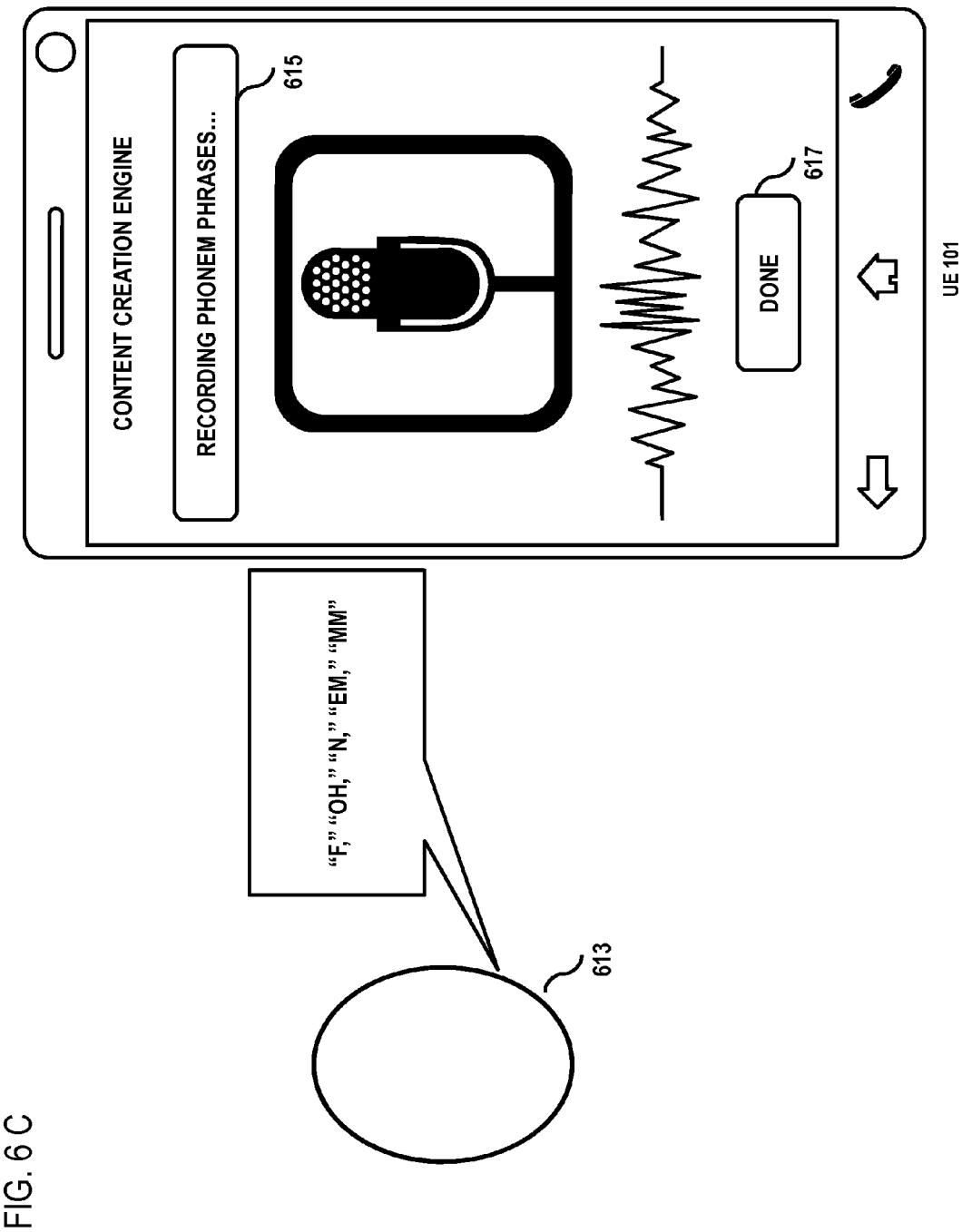
Figure 7A:
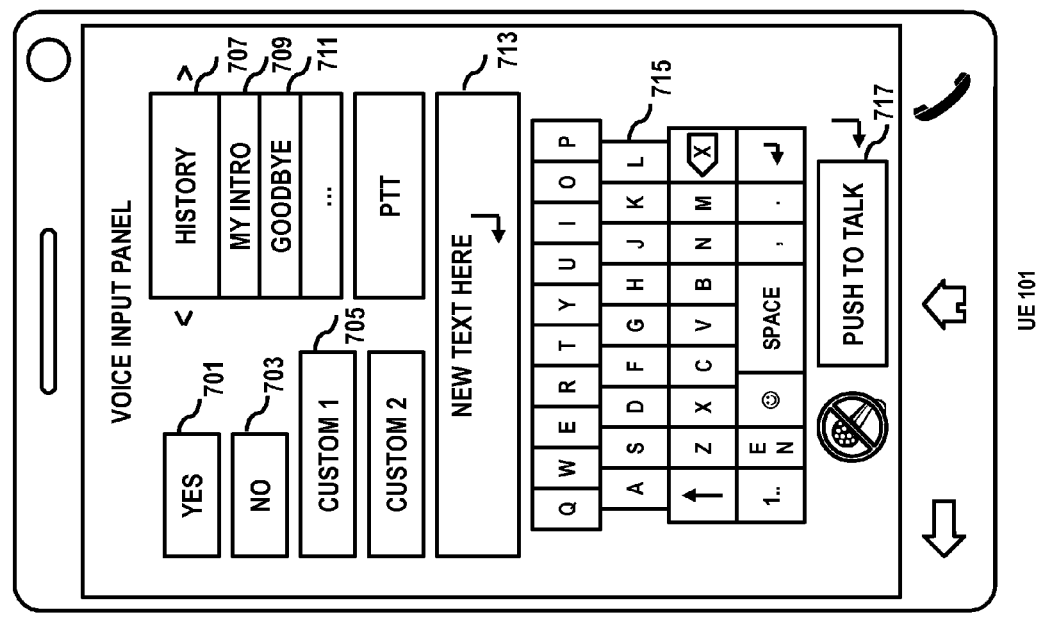
FIGS. 7 A-D are user interface diagrams that represent a scenario wherein graphics primitives such as menus, buttons, data entry fields, etc. are presented to a user for creating textual input and/or touch-based input, according to one example embodiment.
Figure 7B:
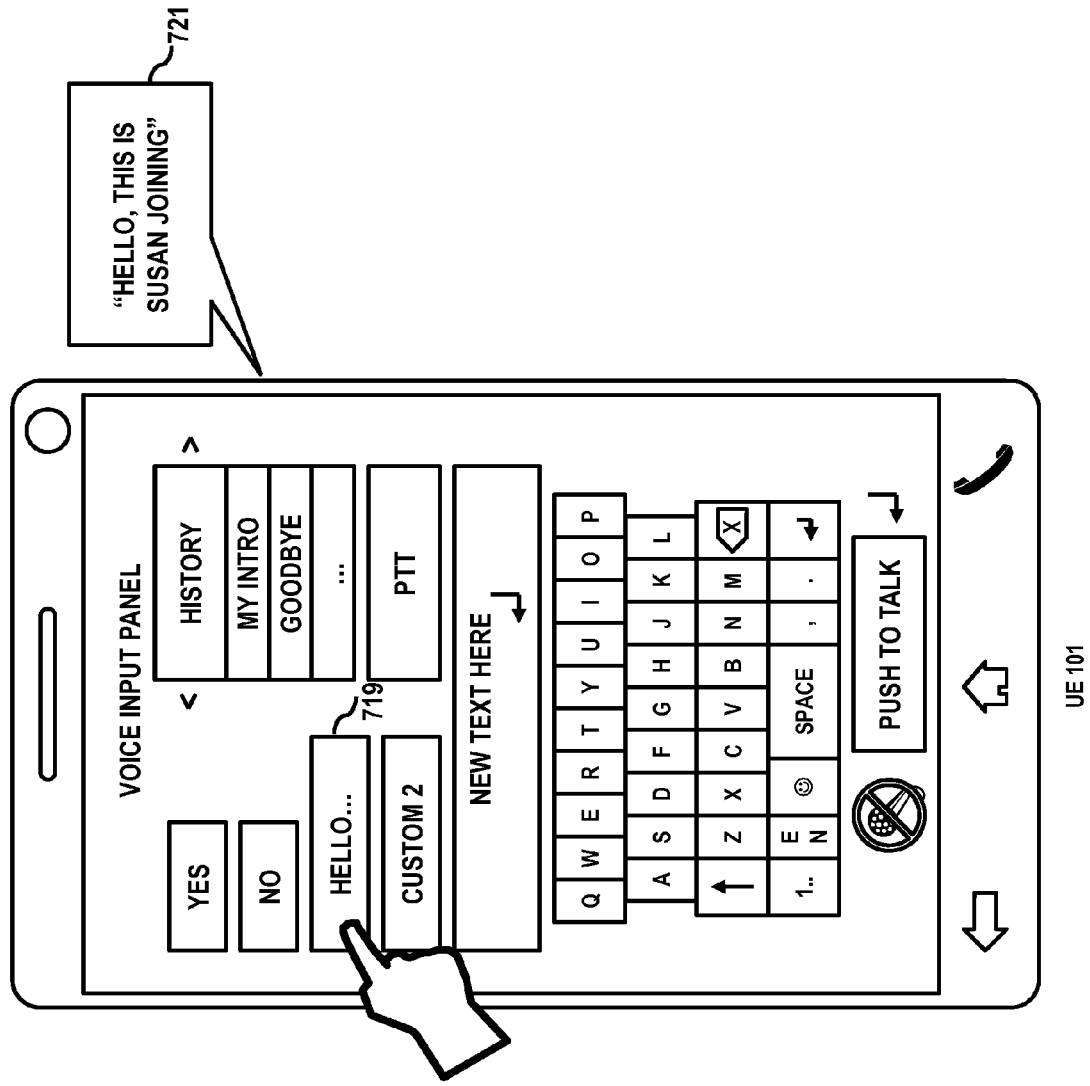
Figure 7C:
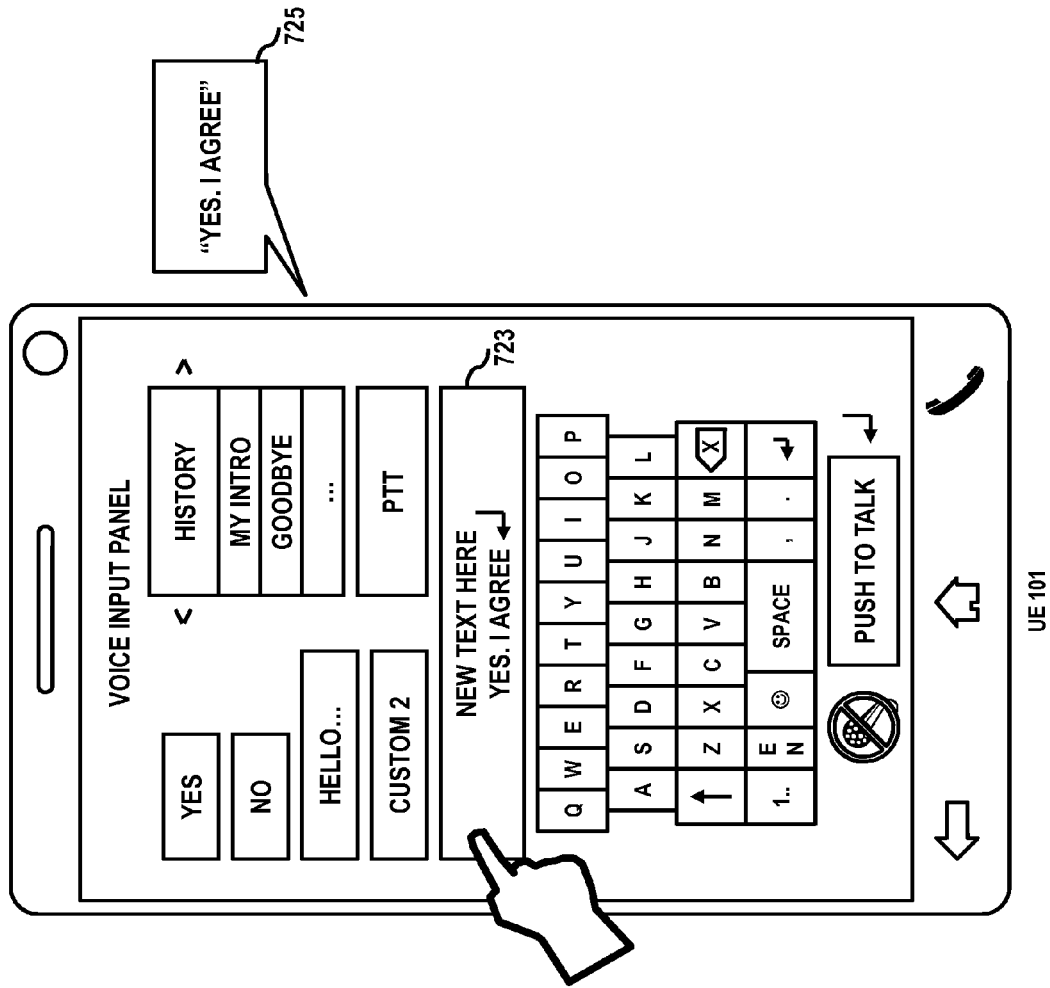
Figure 7D:
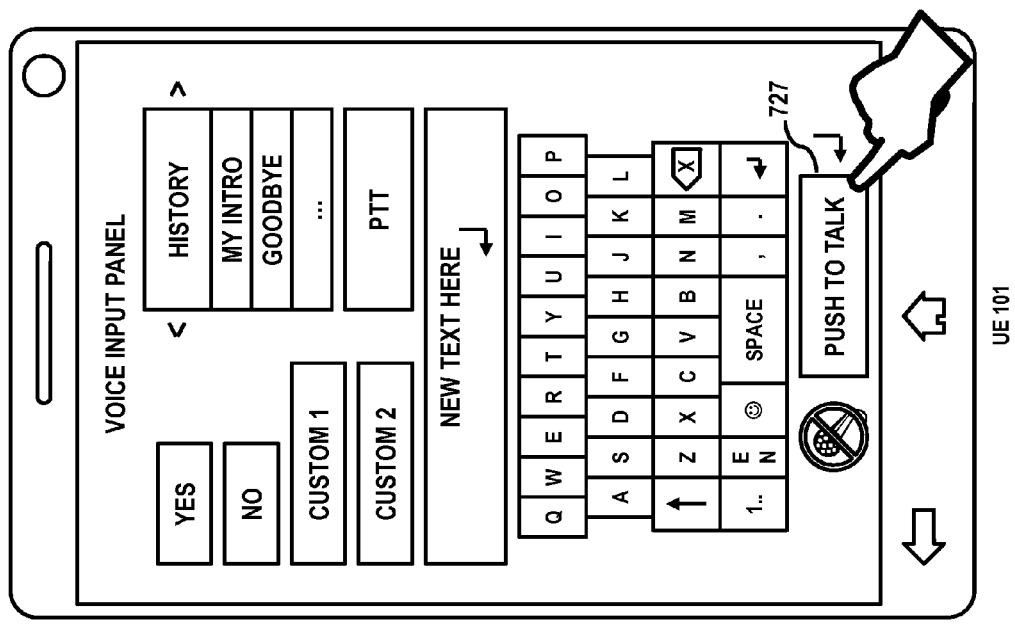

FIGS. 6 A-C are user interface diagrams that represent a scenario wherein a user records his/her voice for future use during a communication session, according to one example embodiment. In one scenario, a user may indicate that he/she wants to record words, sentences etc. for playback via user interaction mechanisms [FIG. 6 A]. Then, the content creation platform 115 may cause a presentation of user interface 601 which includes user interface element 603 wherein a user is asked whether he/she wishes to sample one or more words for playback. The user may accept by clicking the record button 605. FIG. 6 B represents a scenario wherein at least one user [607] may dictate one or more words and/or sentences to the at least one UE 101. Then, the at least one UE 101 may record the words and/or sentences uttered by the at least one user [609] for future use during a communication session. The user [607] may click done [611] once the recording is complete. FIG. 6 C represents a scenario, wherein at least one user [613] upon completion of all custom phrases may opt to record phoneme creation phrases. The one or more phoneme phrases are selected by the content creation platform 115 to ensure all phonetic patterns are uttered by the user and recorded by the system for future use. In one scenario, at least one user [613] may record phoneme phrases recommended by the content creation platform 115 by pressing the record phoneme phrases button [615]. Then, the user [613] may click done [617] once the recording of the phoneme phrases is complete. In one scenario, once the recordings are complete, they are uploaded to database 211. These recordings may be downloaded to the UE 101 for low latency triggering or may be played directly from the database 211 directly into a communication session.

FIGS. 7 A-D are user interface diagrams that represent a scenario wherein graphics primitives such as menus, buttons, data entry fields, etc. are presented to a user for creating textual input and/or touch-based input, according to one example embodiment. In one scenario, a polite caller may not want to disturb people around him, for this reason instead of speaking he may utilize the user interface elements [701-717] presented by the user interface module 209 [FIG. 7 A]. In one scenario, a user may press the 'yes' tab [701] if he agrees with the other participants of the communication session, whereupon the content creation platform 115 may interject user's pre-recorded words into the session. In another scenario, a user may create custom messages [705], for example, a user may record a message 'I will get back to you on your questions later' and may play the recorded message as deemed fit by pressing the 'custom' tab [705]. In a further scenario, a user may browse through a list of previously recorded words and sentences by clicking the 'history' tab [707]. In one scenario, a user may press the 'introduction' tab [709] to introduce himself during a communication session. In another scenario, a user may be presented with a text typing area [713] wherein a user may type words [715] that he wishes to be interjected in the communication session. Then, the content creation platform 115 may convert the texts to speech, and may interject the speech in the communication session. In a further scenario, a user may also be provided with an option to talk [717].

FIG. 7 B is a user interface diagrams that represent a scenario wherein a user is in a communication session and wishes to provide vocal feedback, according to one example embodiment. In one scenario, a user may press the tab [719] to infuse a vocal response to a communication session, for example, the content creation platform 115 may interject a sentence 'Hello, this is Susan joining' [721] to let the other participants know of her presence. Similarly, as other users discuss the topic, and when opinions are solicited the user may press one or more buttons pre-recoded responses.

FIG. 7 C is a user interface diagrams that represent a scenario wherein a user types the texts [723] to be interjected in a communication session, according to one example embodiment. In one scenario, the content creation platform 115 may play the user message [725] into the audio feed of the call in place of a microphone source. In another scenario, the specific button [723] used by a user can stay on screen, or may be scrolled-off the screen or may become part of a history menu [707]. This can occur for all buttons or entries. In a further scenario, the usage of one or more words and/or sentences may be reported to the content creation platform 115 for statistical processing to predict future and likely contextual re-usages. In one scenario, if original content is needed, a user can type in their phrase. The phrase is built using a speech to text system and injected into the call using the users own phonemes. In another scenario, a user can store this typed phrases for immediate use in database 211 or may reuse later as either speech audio or text. In a further scenario, a prerecorded component may be pre/post-pended to the typed content for clarity, for example, a pre-recorded phrase 'Susan here' may be added to the beginning of a typed response 'let's go with Steve's suggestion'.

FIG. 7 D is a user interface diagrams that represent a scenario wherein direct communication by the user is needed. In such instance, a user may press the Push-to-Talk' tab [727] to open the microphone directly, and the user may interact with the other participants in the communication session in a typical manner. In one embodiment, the content creation platform 115 may record all manners of input for future replay.

Figure 8:
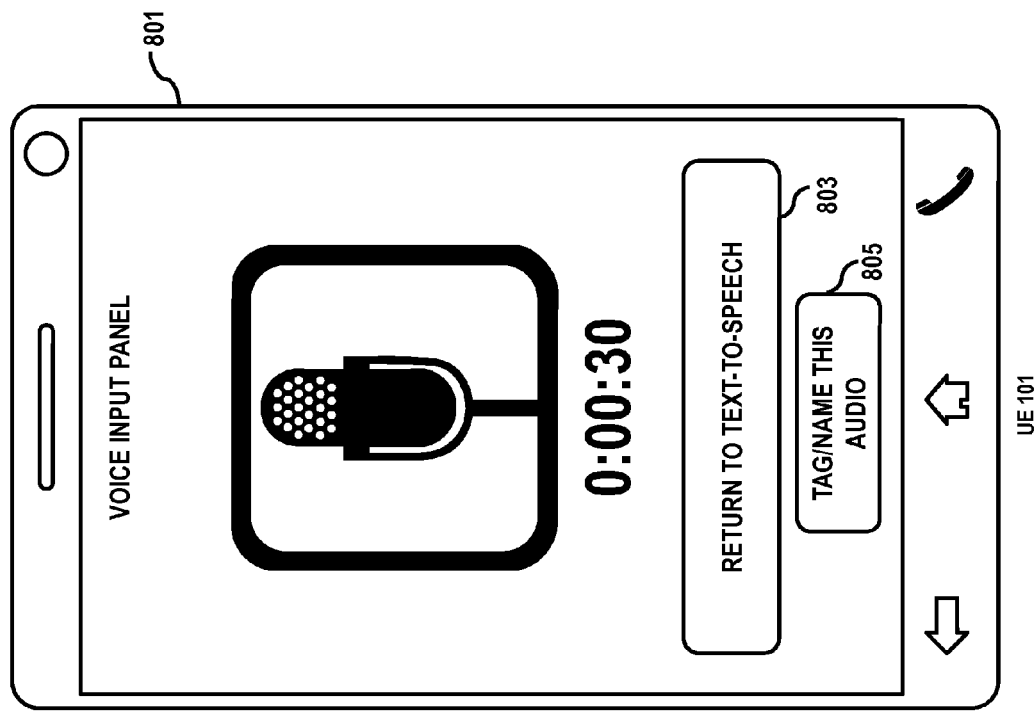
FIG. 8 is a user interface diagram that represents a scenario wherein a user is recording a message for a future conference call, and the user is also presented with an option to return to text to speech, according to one example embodiment.

FIG. 8 is a user interface diagram that represents a scenario wherein a user is recording a message for a future conference call [801], and the user is also presented with an option to return to text to speech [803], according to one example embodiment. In one embodiment, a user may be presented with a 'Tag/Name this Audio' button [805] for assigning a text label to a recording. Such label names may also be automatically generated (through speech to text) and offered as a suggestion, or may be manually entered.

Figure 9:
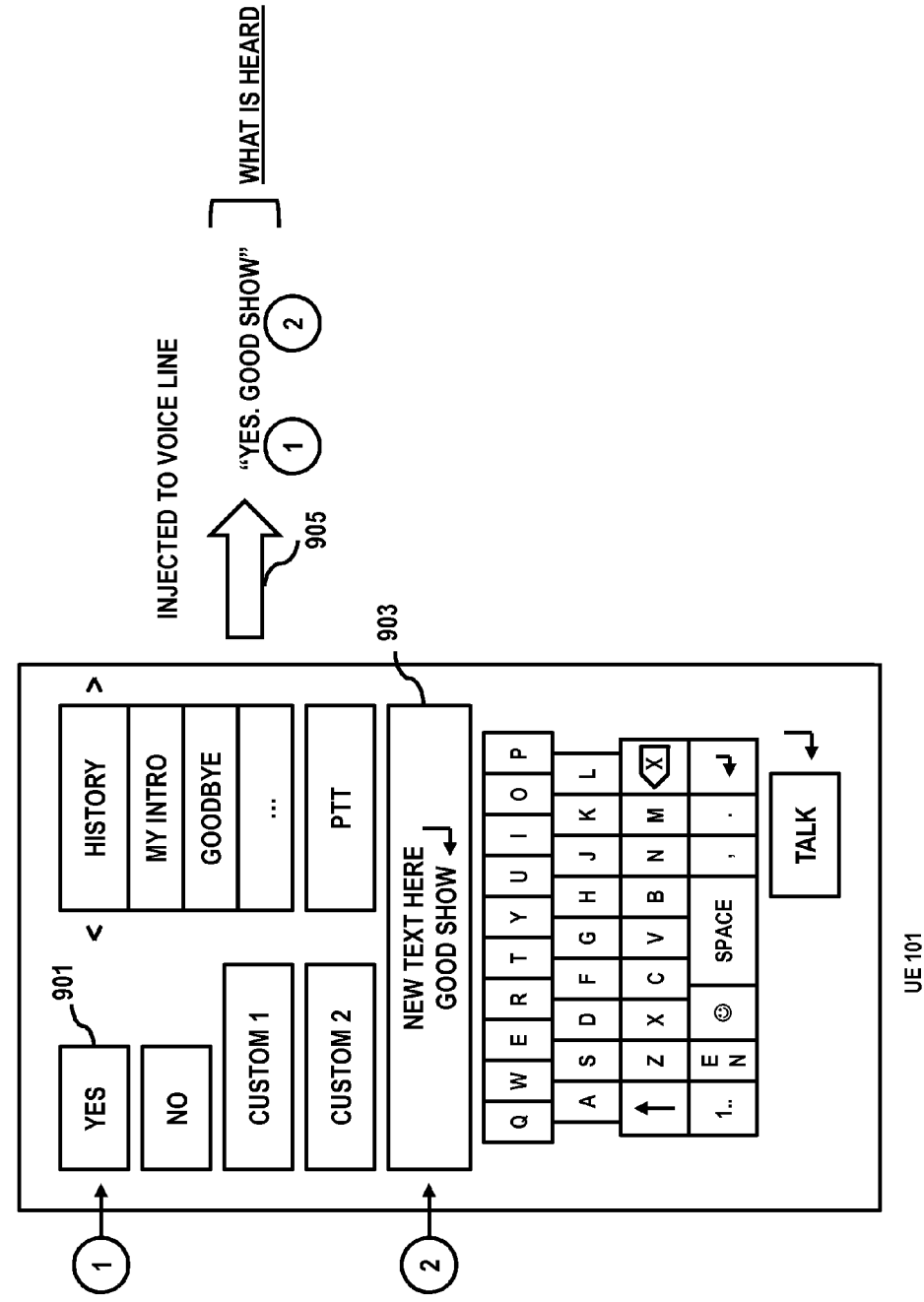
FIG. 9 is a user interface diagram that represents a scenario wherein a pre-recorded message is pre-pended to the typed content for clarity, according to one example embodiment.

FIG. 9 is a user interface diagram that represents a scenario wherein a pre-recorded message is pre-pended to the typed content for clarity, according to one example embodiment. In one scenario, a user may click a tab [901] and may type 'good show' [903], whereupon the content creation platform 115 may prepend the pre-recorded message 'yes' to the typed message 'good show'. Then, the content creation platform 115 may interject the newly created message into a communication session [905].

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

Figure 10:
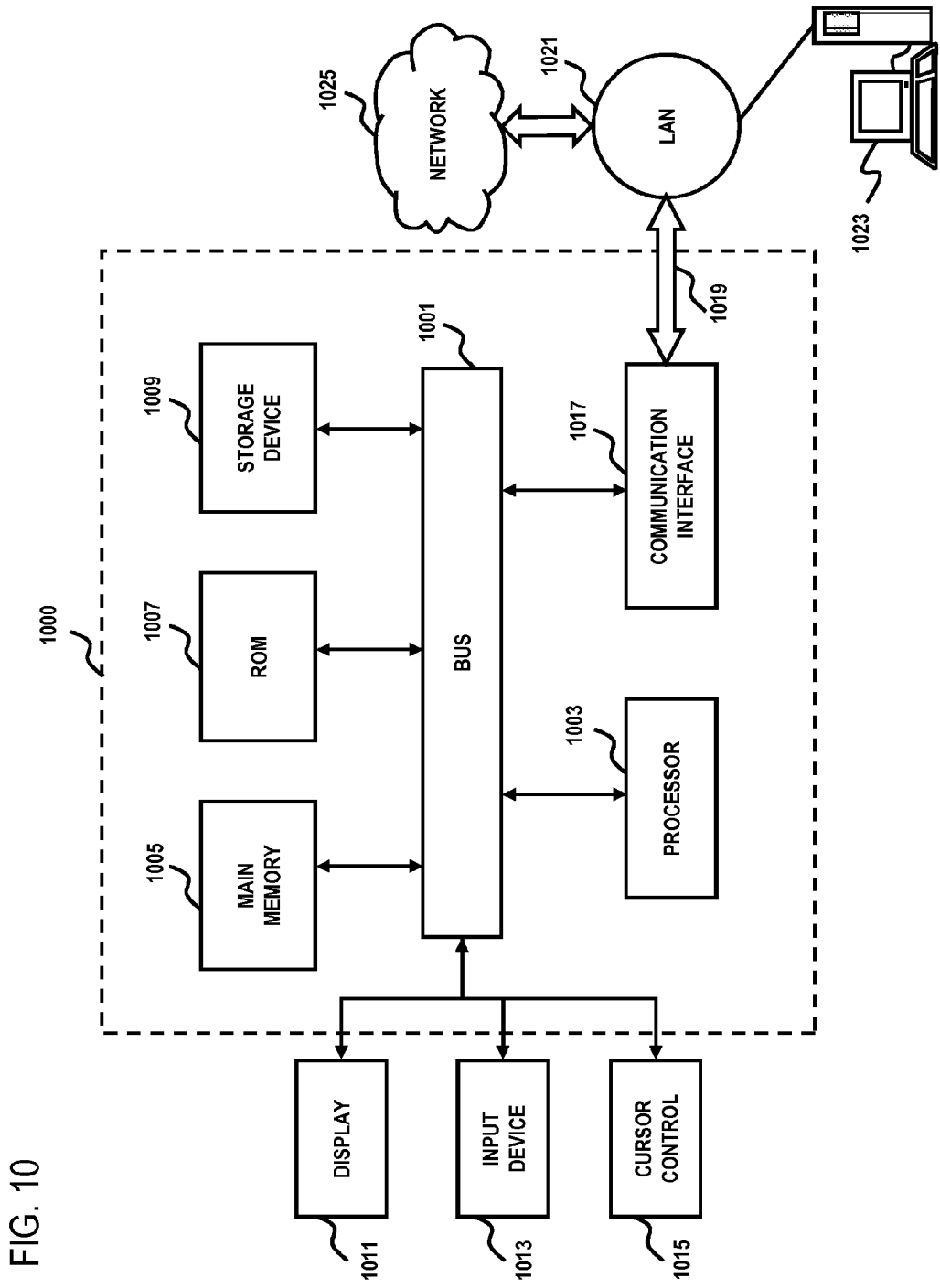
FIG. 10 is a diagram of a computer system that can be used to implement various exemplary embodiments.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
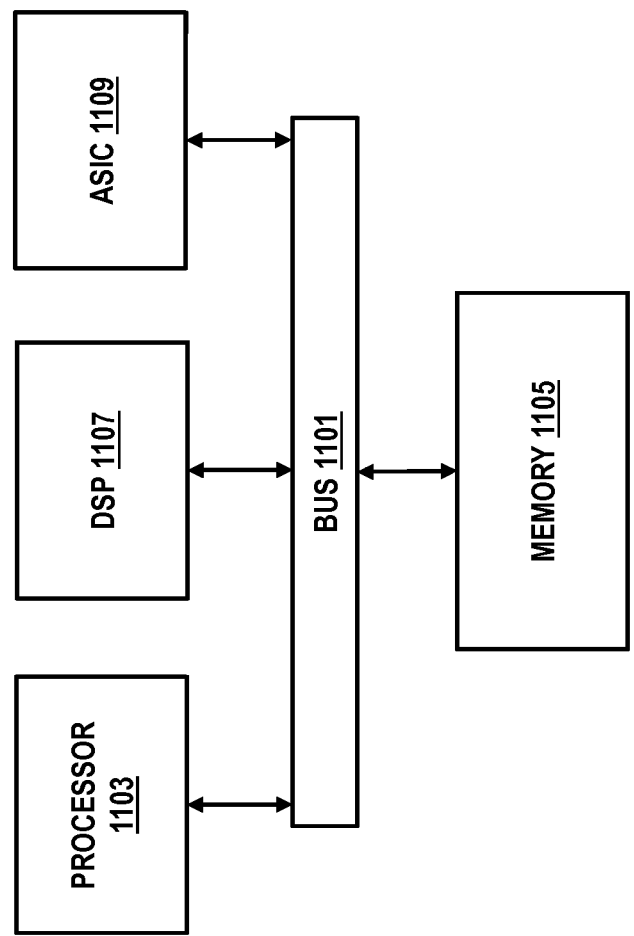
FIG. 11 is a diagram of a chip set that can be used to implement various exemplary embodiments.

FIG. 11 illustrates a chip set 1100 upon which an embodiment of the invention may be implemented. Chip set 1100 is programmed to present a slideshow as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of FIGS. 3-5.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   detecting an ongoing voice call, between a first party and a second party, at a user device associated with the first party;
   presenting, by the user device and during the ongoing voice call, a user interface that includes a control option that allows selection of a pre-recorded word or phrase, from a plurality of pre-recorded words or phrases, the pre-recorded word or phrase having been received from a user of the user device prior to the ongoing voice call;
   receiving, by the user device, via the user interface, and during the ongoing voice call, a selection of a particular pre-recorded word or phrase from the plurality of words or phrases;
   receiving, by the user device, via the user interface, and during the ongoing voice call, another word or phrase and an indication to pre-pend or post-pend the another word or phrase to the particular pre-recorded word or phrase; and
   interjecting, by the user device and in accordance with the indication, the selected particular pre-recorded word or phrase and the another word or phrase, into the ongoing voice call, the interjecting including outputting, via the ongoing voice call and to the second party, the selected particular pre-recorded word or phrase and the another word or phrase,
   the another word or phrase being pre-pended or post-pended to the selected particular pre-recorded word or phrase, based on the indication.

2. The method of claim 1, further comprising:
   presenting an input element in the user interface, the input element including an option to receive a text input that specifies a typed audio word or phrase corresponding to the particular pre-recorded audio word or phrase.

3. The method of claim 2, further comprising:
   processing the particular pre-recorded audio word or phrase via a speech-to-text engine to generate a text equivalent; and
   comparing the text equivalent to the text input to calculate an accuracy of the particular pre-recorded audio word or phrase.

4. The method of claim 3, further comprising:
   determining a correction parameter for generating the particular pre-recorded word or phrase based on the accuracy on a per-user basis.

5. The method of claim 1, further comprising:
   performing a statistical tracking of the particular pre-recorded word or phrase.

6. The method of claim 1, further comprising:
   automatically placing the ongoing voice call in a muted state for the user when presenting the user interface, the muted state causing a microphone, of the user device, to be muted while the user interface is presented.

7. The method of claim 1, further comprising:
   automatically interjecting one or more additional pre-recorded words or phrases based on a termination of the ongoing voice call.

8. A user device, comprising:
   a memory device storing processor-executable instructions; and
   a processor configured to execute the processor-executable instructions, wherein executing the processor-executable instructions causes the processor to:
   present, during an ongoing voice call in which the user device is involved, a user interface that includes a control option that allows selection of a pre-recorded word or phrase, from a plurality of pre-recorded words or phrases, that has been received from a user of the user device prior to the ongoing voice call,
   wherein the ongoing voice call is a voice call between the user device and at least one other party;
   receive, via the user interface and during the ongoing voice call, a selection of a particular pre-recorded word or phrase from the plurality of pre-recorded words or phrases;
   receive, via the user interface and during the ongoing voice call, another word or phrase and an indication to pre-pend or post-pend the another word or phrase to the particular pre-recorded word or phrase; and
   interject the selected particular pre-recorded word or phrase and, in accordance with the indication, the another word or phrase, into the ongoing voice call, the interjecting including outputting, via the ongoing voice call and to the at least one other party, the selected particular pre-recorded word or phrase and the another word or phrase, based on the indication.

9. The user device of claim 8, wherein executing the processor-executable instructions further causes the processor to:
   present an input element in the user interface, the input element including an option to receive a text input that specifies a typed word or phrase corresponding to the particular pre-recorded audio word or phrase.

10. The user device of claim 9, wherein executing the processor-executable instructions further causes the processor to:
    process the particular pre-recorded audio word or phrase via a speech-to-text engine to generate a text equivalent; and
    compare the text equivalent to the text input to calculate an accuracy of the particular pre-recorded audio word or phrase.

11. The user device of claim 10, wherein executing the processor-executable instructions further causes the processor to:
    determine a correction parameter for generating the particular pre-recorded word or phrase based on the accuracy on a per-user basis.

12. The apparatus of claim 8, wherein executing the processor-executable instructions further causes the processor to:
    perform a statistical tracking of the particular pre-recorded word or phrase.

13. The user device of claim 8, wherein executing the processor-executable instructions further causes the processor to:
    automatically place the voice call in a muted state for the user when presenting the user interface, the muted state causing a microphone, of the user device, to be muted while the user interface is presented.

14. The user device of claim 8, wherein executing the processor-executable instructions further causes the processor to:
    automatically interject one or more additional pre-recorded words or phrases based on a termination of the ongoing voice call.

15. A non-transitory computer-readable medium storing processor-executable instructions, which, when executed by a processor of a user device, cause the processor to:

present, during an ongoing voice call in which the user device is involved, a user interface that includes a control option that allows selection of a pre-recorded word or phrase, from a plurality of pre-recorded words or phrases, that has been received from a user of the user device prior to the ongoing voice call,
   wherein the ongoing voice call is a voice call between the user device and at least one other party;
receive, via the user interface and during the ongoing voice call, a selection of a particular pre-recorded word or phrase from the plurality of pre-recorded words or phrases;
receive, via the user interface, and during the ongoing voice call, another word or phrase and an indication to pre-pend or post-pend the another word or phrase to the particular pre-recorded word or phrase; and
interject the selected particular pre-recorded word or phrase into the ongoing voice call, and, in accordance with the indication, the another word or phrase, into the ongoing voice call,
   the interjecting including outputting, via the ongoing voice call and to the at least one other party, the selected particular pre-recorded word or phrase and the another word or phrase, based on the indication.

16. The non-transitory computer-readable medium of claim 15, wherein the processor-executable instructions further include instructions to:
present an input element in the user interface, the input element including an option to receive a text input that specifies a typed audio word or phrase corresponding to the particular pre-recorded audio word or phrase.

17. The non-transitory computer-readable medium of claim 15, wherein the processor-executable instructions further include instructions to:
process the particular pre-recorded audio word or phrase via a speech-to-text engine to generate a text equivalent; and
compare the text equivalent to the text input to calculate an accuracy of the particular pre-recorded audio word or phrase.

18. The non-transitory computer-readable medium of claim 17, wherein the processor-executable instructions further include instructions to:
determine a correction parameter for generating the particular pre-recorded word or phrase based on the accuracy on a per-user basis.

19. The method of claim 1, further comprising:
providing, via the user interface and during the ongoing voice call, a visual preview of the selected particular pre-recorded word or phrase and the another word or phrase.

20. The method of claim 1, further comprising:
prior to interjecting the particular pre-recorded word or phrase and the other word or phrase into the ongoing voice call, determining a longer phrase that includes one or more words in addition to the pre-recorded word or phrase and the other word or phrase,
wherein interjecting the particular pre-recorded word or phrase and the other word or phrase includes interjecting the longer phrase into the ongoing voice call.

* * * * *